US012403469B2

(12) United States Patent
Mar et al.

(10) Patent No.: US 12,403,469 B2
(45) Date of Patent: Sep. 2, 2025

(54) WELL ASSEMBLIES AND RELATED METHODS

(71) Applicant: ILLUMINA, INC., San Diego, CA (US)

(72) Inventors: Cameron Mar, San Diego, CA (US); Payam Taheri, San Diego, CA (US); Cyril Delattre, Lyons (FR); Paul Crivelli, San Diego, CA (US); Wesley Cox-Muranami, Middleton, WI (US); Zhenning Cao, San Diego, CA (US); Travis Beckman, San Diego, CA (US); Justin Davidson, San Diego, CA (US)

(73) Assignee: ILLUMINA, INC., San Diego, CA (US)

( * ) Notice: Subject to any disclaimer, the term of this patent is extended or adjusted under 35 U.S.C. 154(b) by 945 days.

(21) Appl. No.: 17/539,534

(22) Filed: Dec. 1, 2021

(65) Prior Publication Data

US 2022/0168737 A1 Jun. 2, 2022

Related U.S. Application Data

(60) Provisional application No. 63/120,130, filed on Dec. 1, 2020.

(51) Int. Cl.
*B01L 3/00* (2006.01)

(52) U.S. Cl.
CPC . *B01L 3/502723* (2013.01); *B01L 2300/0681* (2013.01); *B01L 2300/0816* (2013.01)

(58) Field of Classification Search
CPC ....... B01L 3/502723; B01L 2300/0681; B01L 2300/0816; B01L 2200/026; B01L 2200/0684; B01L 2200/16; B01L 2300/0829
See application file for complete search history.

(56) References Cited

U.S. PATENT DOCUMENTS

| | | | | |
|---|---|---|---|---|
| 5,710,043 | A * | 1/1998 | Pay | C12M 29/20 435/297.5 |
| 7,625,760 | B2 | 12/2009 | Kitaguchi et al. | |
| 2003/0005967 | A1 | 1/2003 | Karp | |
| 2004/0018523 | A1 | 1/2004 | Hawkins | |
| 2008/0003650 | A1* | 1/2008 | Banerji | B01L 9/523 422/547 |
| 2011/0212453 | A1 | 9/2011 | Agarwal et al. | |

(Continued)

FOREIGN PATENT DOCUMENTS

| | | | |
|---|---|---|---|
| WO | WO-00/72970 | A1 | 12/2000 |
| WO | WO-2018/055407 | A1 | 3/2018 |

*Primary Examiner* — John McGuirk
(74) *Attorney, Agent, or Firm* — MARSHALL, GERSTEIN & BORUN LLP

(57) ABSTRACT

Well assemblies and related methods are disclosed. In accordance with an implementation, an apparatus includes a liquid reservoir containing a liquid and a well assembly including a body, a hydrophobic venting membrane, and a cover. The body defines a well and has an opening and a port. The port is couplable to the liquid reservoir. The hydrophobic venting membrane is coupled to the body and covers the opening and cover covers the hydrophobic venting membrane. As the liquid is flowed into the well via the port, the hydrophobic venting membrane vents gas contained within the well.

22 Claims, 8 Drawing Sheets

(56) References Cited

U.S. PATENT DOCUMENTS

| | | | | |
|---|---|---|---|---|
| 2013/0295663 | A1* | 11/2013 | Weight | C12Q 1/686 435/304.1 |
| 2015/0353919 | A1* | 12/2015 | Mielke | B01L 3/5029 435/6.12 |
| 2017/0153217 | A1 | 6/2017 | Johnston | |
| 2020/0122141 | A1 | 4/2020 | Haghgooie et al. | |
| 2022/0032306 | A1* | 2/2022 | Cauley, III | B01L 3/527 |

* cited by examiner

WELL ASSEMBLIES AND RELATED METHODS

RELATED APPLICATION

This application claims the benefit of and priority to U.S. Provisional Patent Application No. 63/120,130, filed Dec. 1, 2020, the content of which is incorporated by reference herein in its entireties and for all purposes.

BACKGROUND

Reagent cartridges used with, for example, sequencing platforms, may include liquid reagent that is kept frozen until use. Keeping the reagent frozen may involve using additional packaging and/or dry ice when transporting the reagent and may involve keeping the reagent within a freezer at a facility. The measures taken to keep the reagent frozen can raise the cost of shipping and may cause some facilities to purchase additional or larger freezers or other equipment to store the reagent cartridges. Moreover, the use of ice packs, dry ice, and/or additional packaging when shipping frozen reagent may reduce sustainability and increase waste.

SUMMARY

Shortcomings of the prior art can be overcome and benefits as described later in this disclosure can be achieved through the provision of well assemblies and related methods. Various implementations of the apparatus and methods are described below, and the apparatus and methods, including and excluding the additional implementations enumerated below, in any combination (provided these combinations are not inconsistent), may overcome these shortcomings and achieve the benefits described herein.

The disclosed examples relate to reagent cartridges including dry reagent that have increased shelf life and stability as compared to liquid reagent and may be shipped and stored at ambient temperature. The disclosed reagent cartridges may thus be shipped and stored at less cost and may not be required to be stored in a freezer.

In accordance with a first implementation, an apparatus includes a liquid reservoir containing a liquid and a well assembly including a body, a hydrophobic venting membrane, and a cover. The body defines a well and has an opening and a port. The port is couplable to the liquid reservoir. The hydrophobic venting membrane is coupled to the body and covers the opening and the cover covers the hydrophobic venting membrane. As the liquid is flowed into the well via the port, the hydrophobic venting membrane vents gas contained within the well.

In accordance with a second implementation, an apparatus includes a well assembly including a body, a hydrophobic venting membrane, and a cover. The body defines a well having an opening and the hydrophobic venting membrane is coupled to the body and covers the opening. The cover covers the hydrophobic venting membrane. The hydrophobic venting membrane vents gas contained within the well.

In accordance with a third implementation, a method includes flowing a liquid into a well having an opening covered by a hydrophobic venting membrane, whereby air is vented through the hydrophobic venting membrane. The method also includes flowing the liquid out of and into the well.

In accordance with a fourth implementation, a method includes pressurizing a dead end of a well by flowing a liquid into the well. A portion of the well is covered by a hydrophobic venting membrane. The method also includes depressurizing the well to flow the liquid out of the well.

In accordance with a fifth implementation, an apparatus includes a liquid reservoir and a well assembling including a body, a mesh, and a cover. The liquid reservoir containing a liquid. The body defining a well containing dried reagent and having an opening and a port. The port being couplable to the liquid reservoir. The mesh coupled to the body, covering the opening, and retaining the dried reagent within the well. The cover covering the mesh.

In further accordance with the foregoing first, second, third, fourth, and/or fifth implementations, an apparatus and/or method may further include any one or more of the following:

In an implementation, the apparatus also includes dried reagent contained within the well and the liquid that flows into the well rehydrates the dry regent.

In another implementation, the apparatus includes a coupling between the liquid reservoir and the well assembly.

In another implementation, the coupling includes a snap-fit connection.

In another implementation, the port is a septum.

In another implementation, the cover includes an impermeable barrier.

In another implementation, the impermeable barrier includes foil.

In another implementation, the cover forms at least part of a dead end.

In another implementation, the cover is coupled to the well and forms an enclosure that captures the gas that vents through the hydrophobic venting membrane.

In another implementation, the well is couplable to a pressure source.

In another implementation, the apparatus includes a support extending across at least a portion of the opening.

In another implementation, the support is disposed between the hydrophobic venting membrane and the cover.

In another implementation, the support includes a lattice structure.

In another implementation, the body includes a plurality of wells each having a corresponding opening and a port.

In another implementation, the body includes an inward extending step that at least partially defines the well and the hydrophobic venting membrane is coupled to the step.

In another implementation, the body includes an inward tapered surface that extends toward the port and defines the well.

In another implementation, the hydrophobic venting membrane covers the openings of the wells.

In another implementation, the cover is coupled to the body and covers the hydrophobic venting membrane.

In another implementation, the cover forms an enclosure above each of the wells.

In another implementation, the cover comprises a frustum.

In another implementation, flowing the liquid into the well includes flowing the liquid into the well containing dry reagent, whereby the liquid rehydrates the dry reagent.

In another implementation, flowing the liquid out of and into the well includes flowing the liquid back and forth between the well and a fluidic line.

In another implementation, flowing the liquid out of and into the well includes flowing the liquid back and forth between the well and a mixing chamber.

In another implementation, flowing the liquid includes flowing the liquid out of and into the well under positive pressure.

In another implementation, flowing the liquid into the well includes pressurizing a dead end of the well.

In another implementation, flowing the liquid out of the well includes pressurizing a dead end of a mixing chamber.

In another implementation, flowing the liquid out of the well includes depressurizing the well.

In another implementation, the method includes piercing a cover covering the opening of the well prior to flowing the liquid into the well.

In another implementation, piercing the cover includes urging the cover against a protrusion In another implementation, flowing the liquid into the well includes flowing the liquid into the well containing dry reagent, whereby the liquid rehydrates the dry reagent.

In another implementation, the method includes iteratively pressurizing the dead end of the well and depressurizing the well.

In another implementation, the method includes limiting deformation of the hydrophobic venting membrane.

It should be appreciated that all combinations of the foregoing concepts and additional concepts discussed in greater detail below (provided such concepts are not mutually inconsistent) are contemplated as being part of the subject matter disclosed herein and/or may be combined to achieve the particular benefits of a particular aspect. In particular, all combinations of claimed subject matter appearing at the end of this disclosure are contemplated as being part of the subject matter disclosed herein.

DETAILED DESCRIPTION

Figure 1:
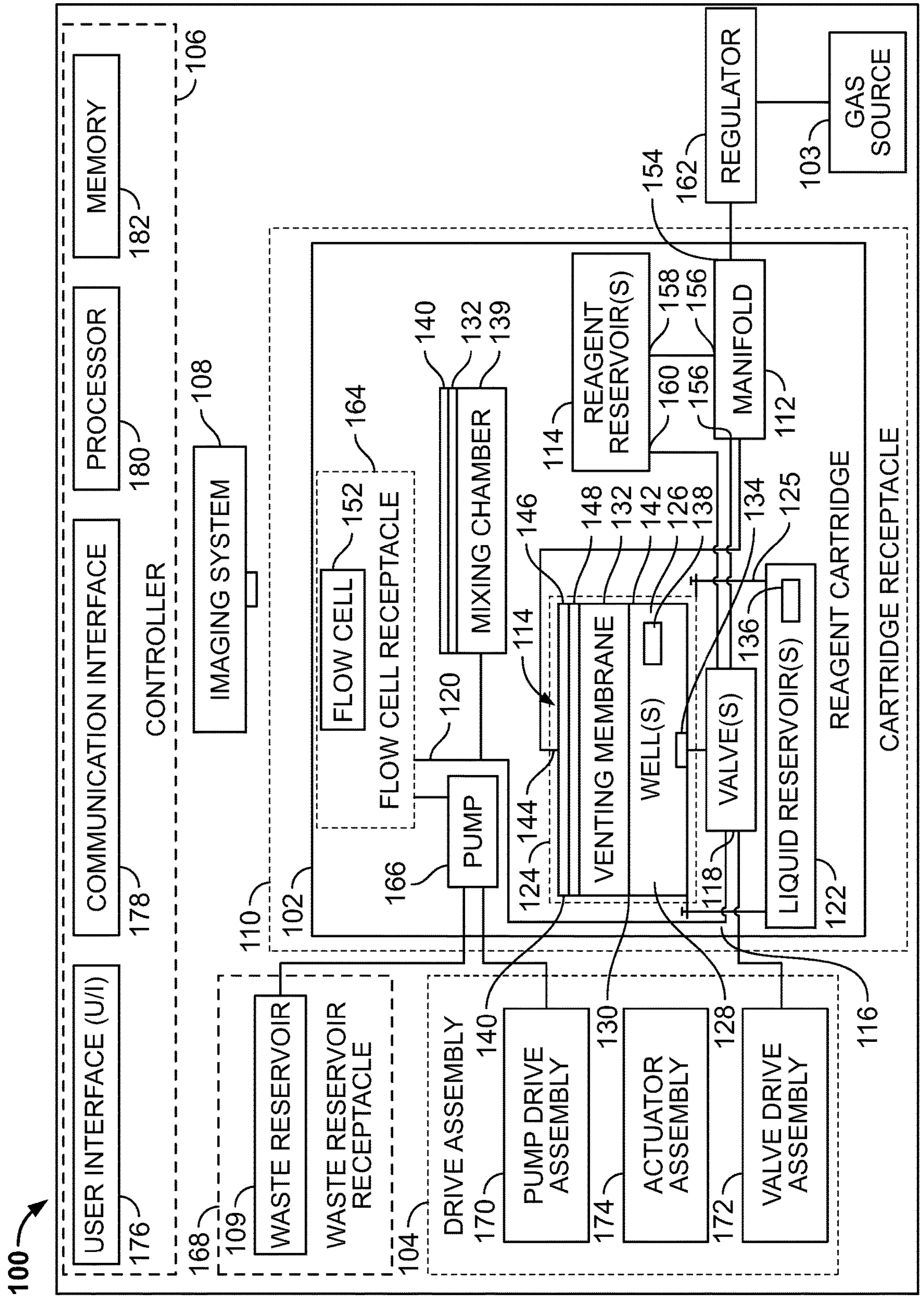
FIG. 1 illustrates a schematic diagram of an implementation of a system in accordance with the teachings of this disclosure.

Although the following text discloses a detailed description of implementations of methods, apparatuses, and/or articles of manufacture, it should be understood that the legal scope of the property right is defined by the words of the claims set forth at the end of this patent. Accordingly, the following detailed description is to be construed as examples only and does not describe every possible implementation, as describing every possible implementation would be impractical, if not impossible. Numerous alternative implementations could be implemented, using either current technology or technology developed after the filing date of this patent. It is envisioned that such alternative implementations would still fall within the scope of the claims.

At least one aspect of this disclosure is directed toward reagent cartridges including one or more two-part reagent reservoirs that enable cost-effective, cartridge-based liquid metering and mixing. These two-part reagent reservoirs include a liquid reservoir containing liquid and a dry reagent well assembly including a dry reagent well containing dry reagent and a hydrophobic venting membrane covering an opening of the well. The venting membrane retains the dry reagent within the well and has high air permeability and high water entry pressure that allows for air venting and prevents liquid passage therethrough. The liquid reservoir may be shipped with or separately from the dry reagent well assembly. The liquid reservoir and the dry reagent well assembly may be coupled together prior to use if the liquid reservoir and the dry reagent well assembly are shipped separately. A snap-fit connection or another coupling may be provided to attach the liquid reservoir and the dry reagent well assembly, for example.

The liquid from the liquid reservoir is flowed into the well of the well assembly to rehydrate the dry reagent and form a liquid reagent as air vents though the venting membrane. The venting membrane allows air to pass through the venting membrane but prevents the liquid from passing through the venting membrane. The venting membrane as such prevents further liquid from flowing into the well once the liquid comes in contact with the venting membrane, thereby enabling precise geometric based metering of the liquid reagent without the use of a precision metering device such as a syringe pump. The dry reagent contained therein is fully reconstituted by fully filling the well of the well assembly with liquid. The venting membrane may be replaced by a mesh in other implementations.

The liquid reagent can be moved using a pump or other pressure source once the dry reagent is rehydrated and the liquid reagent is formed between the well and a fluidic line and/or a mixing chamber and/or to a flow cell. The pressure source may move the liquid reagent out of the well using a positive pressure source from above the hydrophobic venting membrane or using a negative pressure source from below the venting membrane.

The venting membrane is covered by an impermeable barrier in some implementations. The impermeable barrier may be foil that substantially prevents moisture ingress and the dry reagent from being inadvertently rehydrated and/or a cover forming an enclosure (e.g., an air spring). When foil is provided, the foil may be pierced prior to or during use. When the air spring is provided, the air spring captures the air that vents through the venting membrane within the corresponding enclosure, thereby providing a positive pressure source to dispense the contents of the well to, for example, a fluidic line, a mixing chamber, and/or a flow cell. The air spring may increase metering accuracy while reducing the complexity and/or the footprint of the reagent cartridge and/or the associated system/instrument.

FIG. 1 illustrates a schematic diagram of an implementation of a system 100 in accordance with the teachings of this disclosure. The system 100 can be used to perform an analysis on one or more samples of interest. The sample may include one or more DNA clusters that have been linearized to form a single stranded DNA (sstDNA). The system 100 receives a reagent cartridge 102 in the implementation shown and includes, in part, a gas source 103, a drive assembly 104, a controller 106, an imaging system 108, and a waste reservoir 109. The controller 106 is electrically and/or communicatively coupled to the drive assembly 104 and to the imaging system 108 and causes the drive assembly 104 and/or the imaging system 108 to perform various functions as disclosed herein.

The reagent cartridge 102 carries the sample of interest. The gas source 103 may, in some implementations, be used to pressurize the reagent cartridge 102 and the drive assembly 104 interfaces with the reagent cartridge 102 to rehydrate dry reagents and to flow one or more liquid reagents (e.g., A, T, G, C nucleotides) through the reagent cartridge 102 that interact with the sample. The gas source 103 may be provided by the system 100 and/or may be carried by the reagent cartridge 102. The gas source 103 may alternatively be omitted.

A reversible terminator is attached to the reagent in an implementation to allow a single nucleotide to be incorporated by the sstDNA per cycle. One or more of the nucleotides has a unique fluorescent label that emits a color when excited in some such implementations. The color (or absence thereof) is used to detect the corresponding nucleotide. The imaging system 108 excites one or more of the identifiable labels (e.g., a fluorescent label) and thereafter obtains image data for the identifiable labels. The labels may be excited by incident light and/or a laser and the image data may include one or more colors emitted by the respective labels in response to the excitation. The image data (e.g., detection data) may be analyzed by the system 100. The imaging system 108 may be a fluorescence spectrophotometer including an objective lens and/or a solid-state imaging device. The solid-state imaging device may include a charge coupled device (CCD) and/or a complementary metal oxide semiconductor (CMOS).

The drive assembly 104 interfaces with the reagent cartridge 102 after the image data is obtained to flow another reaction component (e.g., a reagent) and/or gas through the reagent cartridge 102 that is thereafter received by the waste reservoir 109 and/or otherwise exhausted by the reagent cartridge 102. The reagent and the gas is alternatingly flowed through the reagent cartridge 102 in an implementation. The reaction component and the gas perform a flushing operation that chemically cleaves the fluorescent label and the reversible terminator from the sstDNA. The sstDNA is then ready for another cycle.

Referring to the reagent cartridge 102, the reagent cartridge 102 is receivable within a cartridge receptacle 110 of the system 100 in the implementation shown and includes a manifold 112, reagent reservoirs 114, a body 116, one or more valves 118, and fluidic lines 120. The reagent cartridge 102 does not include the manifold 112 in other implementations. The reagent reservoirs 114 may contain fluid (e.g., reagent and/or another reaction component) and the valves 118 may be selectively actuatable to control the flow of fluid through the fluidic lines 120. One or more of the valves 118 may be implemented by a valve manifold, a rotary valve, a pinch valve, a flat valve, a solenoid valve, a check valve, a piezo valve, etc. If a rotary valve is used, the reagent cartridge 102 and/or the system 100 may include the valve (s) 118.

The body 116 may be formed of solid plastic using injection molding techniques and/or additive manufacturing techniques. The reagent reservoirs 114 are integrally formed with the body 116 in some implementations. The reagent reservoirs 114 may, however, be separately formed and coupled to the body 116. The reagent reservoirs 114 and/or the reagent cartridge 102 may include polypropylene and/or cyclic olefin copolymer (COC) with an over molded Santoprene thermoplastic elastomer (TPE) or another thermoplastic elastomer. Other materials may prove suitable for the reagent reservoirs 114 and/or the reagent cartridge 102.

One or more of the reagent reservoirs 114 include a liquid reservoir 122 and a well assembly 124 couplable to the liquid reservoir 122 in the implementation shown. The liquid reservoir 122 and/or the well assembly 124 may be considered modular components that may be coupled together using a coupling 125 such as a snap-fit connection or another fastener. The liquid reservoir 122 and the well assembly 124 alternatively may be separate components that are fluidically coupled but the coupling 125 itself may not be included.

The well assembly 124 includes a body 126 defining a well 128 having an opening 130 and a hydrophobic venting membrane 132 coupled to the body 126 and covering the opening 130. While the venting membrane 132 is mentioned being included, a mesh and/or another covering having air permeability may be included instead or additionally. The venting membrane 132 may be coupled to the body 126 by heat sealing, laser welding, ultrasonic welding, pressure-sensitive adhesive (PSA), or any other suitable method. The body 126 also includes a port 134 that is couplable to the liquid reservoir 122. The port 134 may be a septum or another fluidic connection (e.g., See, FIGS. 5 and 6).

The venting membrane 132 allows liquid from the liquid reservoir 122 to be flowed into the well 128 as the venting membrane 132 vents gas contained within the well 128. The venting membrane 132 advantageously meters a precise volume of liquid within the well 128 by substantially preventing liquid from flowing therethrough while removing gas and/or bubbles from the well 1287 and/or the liquid. Highly accurate and precise geometric metering is achieved using the disclosed examples by flowing liquid into the well 128 for a particular amount of time, at a particular pressure, and/or until a substantial pressure equilibrium is achieved between the gas source 103 and the well 128 without the use of a precision metering device such as a syringe pump. The well 128 can have a volume of approximately 10 microliters (μL) and/or up to the tens of milliliters (ml) (e.g., approximately 50 ml). The well 128 may however have any other size. While the well 128 is shown coupled to the liquid reservoir 122, via the valve 118, in other implementations, the well 128 is directly coupled to the liquid reservoir 122. The well 128 and the liquid reservoir 122, however, can be coupled (e.g., fluidic coupling) in any suitable manner.

The liquid reservoir 122 may contain liquid 136 such as a buffer or water and the well 128 may contain a lyophilized reagent (e.g., freeze-dried reagent) 138. The dry reagent 138 may be a cake, microspheres, and/or a powder. The venting membrane 132 may retain the dry reagent 138 within the well 128.

The liquid 136 and the dry reagent 138 can be flowed into and out of the well 128 to mix the liquid 136 and the dry reagent 138. The mixing process may occur by flowing the liquid 136 and the dry reagent 138 between the well 128 and one of the fluidic lines 120 or between the well 128 and a mixing chamber 139. The disclosed examples may thus also be used to mix the liquid and the dry reagent. The mixing chamber 139 is shown including a venting membrane 132 and, in some implementations, includes a mixer such as a magnet or a stir rod to further mix the liquid and the dry reagent. While the mixing chamber 139 is shown downstream of the well 128, the mixing chamber 139 may alternatively be disposed upstream of the well 128. The mixer may, however, be positioned in a different location or omitted.

The liquid reservoir 122 may be filled with liquid 136 prior to shipping or may be filled by an individual and/or the system 100 prior to use. The well assembly 124 may be ambient shipped and/or stored because the well 128 may house the dry reagent and not liquid reagent. Such an approach may simplify storage requirements, reduce shipping costs, and increase the speed of workflows by, for example, avoiding thaw time before the reagent may be used. While the liquid reservoir 122 is mentioned housing liquid and the well 128 is mentioned housing dry reagent, the liquid reservoir 122 and/or the well 128 may contain another substance(s) (e.g., solids and/or liquids) or the liquid reservoir 122 and/or the well 128 may be empty.

The opening 130 of the well 128 is covered by a cover 140 in the implementation shown. The cover 140 may be a liquid impermeable barrier that reduces the likelihood and may even prevent dry reagent contained within the well 128 from being inadvertently rehydrated, or at least reduces the rate at which the dry reagent contained within the well 128 is rehydrated, via the ingress of moisture. The cover 140 may be a pierceable or removable cover including thin metal foil, such as aluminum foil, or by a thin plastic sheet(s), such as Saran™ wrap. The cover 140 may however comprise or consist of other materials and/or other layering arrangements that substantially prevent moisture ingress into the dry reagent.

When the cover 140 is made of pierceable foil, the system 100 may pierce the cover 140 or the cover 140 may be pierced by an individual prior to use. The liquid 136 may be drawn out of the well 128 in such implementations using negative pressure or an end 142 of the well 128 may be fluidically coupled to the gas source 103 and/or to a pressure source of the system 100 via a fluidic coupling 144. The fluidic coupling 144 may be a gasket interface that couples with the well 128 and/or the fluidic coupling 144 may be a collar that surrounds the end 142 of the well 128. The fluidic coupling 144 may also include a piercing member such as a conical protrusion that is used to pierce the cover 140 as and/or prior to the fluidic coupling 144 is being formed.

The cover 140 can be coupled to the body 126 and positioned over the opening 130 to form an enclosure 146 that captures the gas that vents through the hydrophobic venting membrane 132 in other implementations. The enclosure 146 can be a dead ended fluidic chamber having a known volume that captures the vented gas and creates a pressure source that can be used to flow the liquid 136 out of the well 128 in response to the valve 118 actuating and releasing the pressure. While the enclosure 146 is mentioned being a dead ended fluidic chamber, the enclosure 146 may also be pressurized by the gas source 103 via the fluidic coupling 144.

Regardless of how the cover 140 is formed, a support 148 can extend across at least a portion of the opening 130 of the well 128 and can be positioned to limit deformation/deflection of the venting membrane 132 when the liquid 136 is flowing into and/or out of the well 128. A flow rate of gas through the venting membrane 132 may decrease when the venting membrane 132 deforms over a threshold amount. A threshold flow rate through the venting membrane 132 can be maintained by providing the support 148 that limits the deformation of the venting membrane 132. The support 148 can be positioned between the venting membrane 132 and the cover 140 to limit deformation of the venting membrane 132 when the liquid 136 flows into the well 128 and/or the venting membrane 132 can be positioned between the support 148 and the cover 140 to limit deformation of the venting membrane 132 when the liquid 136 flows out of the well 128. The support 148 can have a lattice structure or may be one or more cross-beams. The support 148 may, however, be formed in different ways.

Referring now to the manifold 112, the manifold 112 is fluidically coupled to the gas source 103, one or more of the reagent reservoirs 114, and the valve 118. The coupling between the components 103, 112, 114, 116 allows gas (e.g., air) to pressurize the reagent cartridge 102 by flowing gas through the manifold 112 to the reagent reservoirs 114 and to the valve 118. The gas source 103 may pressurize the reagent to flow the reagent through the fluidic lines 120 under positive pressure, which increases the flow rate through the reagent cartridge 102 and/or decreases a response time to flow the reagent between the well 128 and the fluidic line 120, the well 128 and the mixing chamber 139, and/or into, for example, a flow cell 152. Pressurizing the reagent reservoirs 114, more generally, reduces cycle times of the system 100. One or more of the reagent reservoirs 114 may alternatively not be pressurized.

The manifold 112 includes an inlet 154 fluidically coupled to the gas source 103 and outlets 156 fluidically coupled to the valve 118 and one of the reagent reservoirs 114. One of the manifold outlets 156 may be fluidically coupled to an inlet 158 of the reagent reservoir 114 in the implementation shown such that the manifold 112 is coupled to the valve 118 via the reagent reservoir 114. The reagent reservoir 114 also includes an outlet 160 fluidically coupled to the valve 118. The manifold 112 may alternatively be directly coupled to the valve 118 by the fluidic line 120. Other arrangements may prove suitable.

A regulator 162 can be positioned between the gas source 103 and the manifold 112 and regulates a pressure of the gas provided to the manifold 112. The regulator 162 may alternatively not be included. The regulator 162 may be implemented by a multi-channel regulator. The pressure applied to, for example, the reagent reservoir 114, is determined by calibrating a flow rate in the reagent cartridge 102 to a pressure of the gas source 103 in an implementation. The pressure may, however, be selected in different ways. One or more regulators 162 may alternatively be positioned between the manifold 112 and the reagent reservoir 114 and/or between the manifold 112 and the valve 118.

The reagent cartridge 102 is in fluid communication with the flow cell 152. The flow cell 152 is carried by the reagent cartridge 102 in the implementation shown and is received via a flow cell receptacle 164. The flow cell 152 can alternatively be integrated into the reagent cartridge 102. The flow cell receptacle 164 may not be included in such implementations or, at least, the flow cell 152 may not be removably receivable within the reagent cartridge 102. As a further alternative, the flow cell 152 may be separate from the reagent cartridge 102.

While the above disclosure describes urging liquid and/or reagent into and out of the well 128 and/or through the flow cell 152 under positive pressure, liquid and/or reagent may alternatively be drawn through the flow cell 152 under negative pressure when, for example, the reagent reservoirs 114 are not pressurized and/or when the venting membrane 132 is replaced by a mesh. The reagent cartridge 102 may include a pump 166 positioned between the flow cell 152 and the waste reservoir 109 to do so. The waste reservoir 109 may be selectively receivable within a waste reservoir receptacle 168 of the system 100. The pump 166 may be implemented by a syringe pump, a peristaltic pump, a diaphragm pump, etc. While the pump 166 may be positioned between the flow cell 152 and the waste reservoir 109, in other implementations, the pump 166 may be positioned upstream of the flow cell 152 or omitted entirely.

Referring now to the drive assembly 104, the drive assembly 104 includes a pump drive assembly 170, a valve drive assembly 172, and an actuator assembly 174 in the implementation shown. The pump drive assembly 170 interfaces with the pump 166 to pump fluid through the reagent cartridge 102 and the valve drive assembly 172 interfaces with the valve 118 to control the position of the valve 118. The actuator assembly 174 interfaces with the cover 140 to pierce the cover 140 when the cover 140 is formed of foil or another pierceable material.

Referring to the controller 106, in the implementation shown, the controller 106 includes a user interface 176, a communication interface 178, one or more processors 180, and a memory 182 storing instructions executable by the one or more processors 180 to perform various functions including the disclosed implementations. The user interface 176, the communication interface 178, and the memory 180 are electrically and/or communicatively coupled to the one or more processors 180.

The user interface 176 receives input from a user in an implementation and provides information to the user associated with the operation of the system 100 and/or an analysis taking place. The user interface 176 may include a touch screen, a display, a key board, a speaker(s), a mouse, a track ball, and/or a voice recognition system. The touch screen and/or the display may display a graphical user interface (GUI).

The communication interface 178 enables communication between the system 100 and a remote system(s) (e.g., computers) via a network(s) in an implementation. The network(s) may include an intranet, a local-area network (LAN), a wide-area network (WAN), the intranet, etc. Some of the communications provided to the remote system may be associated with analysis results, imaging data, etc. generated or otherwise obtained by the system 100. Some of the communications provided to the system 100 may be associated with a fluidics analysis operation, patient records, and/or a protocol(s) to be executed by the system 100.

The one or more processors 180 and/or the system 100 may include one or more of a processor-based system(s) or a microprocessor-based system(s). The one or more processors 180 and/or the system 100 includes a reduced-instruction set computer(s) (RISC), an application specific integrated circuit(s) (ASICs), a field programable gate array(s) (FPGAs), a field programable logic device(s) (FPLD(s)), a logic circuit(s), and/or another logic-based device executing various functions including the ones described herein in some implementations.

The memory 182 can include one or more of a hard disk drive, a flash memory, a read-only memory (ROM), erasable programable read-only memory (EPROM), electrically erasable programable read-only memory (EEPROM), a random-access memory (RAM), non-volatile RAM (NVRAM) memory, a compact disk (CD), a digital versatile disk (DVD), a cache, and/or any other storage device or storage disk in which information is stored for any duration (e.g., permanently, temporarily, for extended periods of time, for buffering, for caching).

Figure 2:
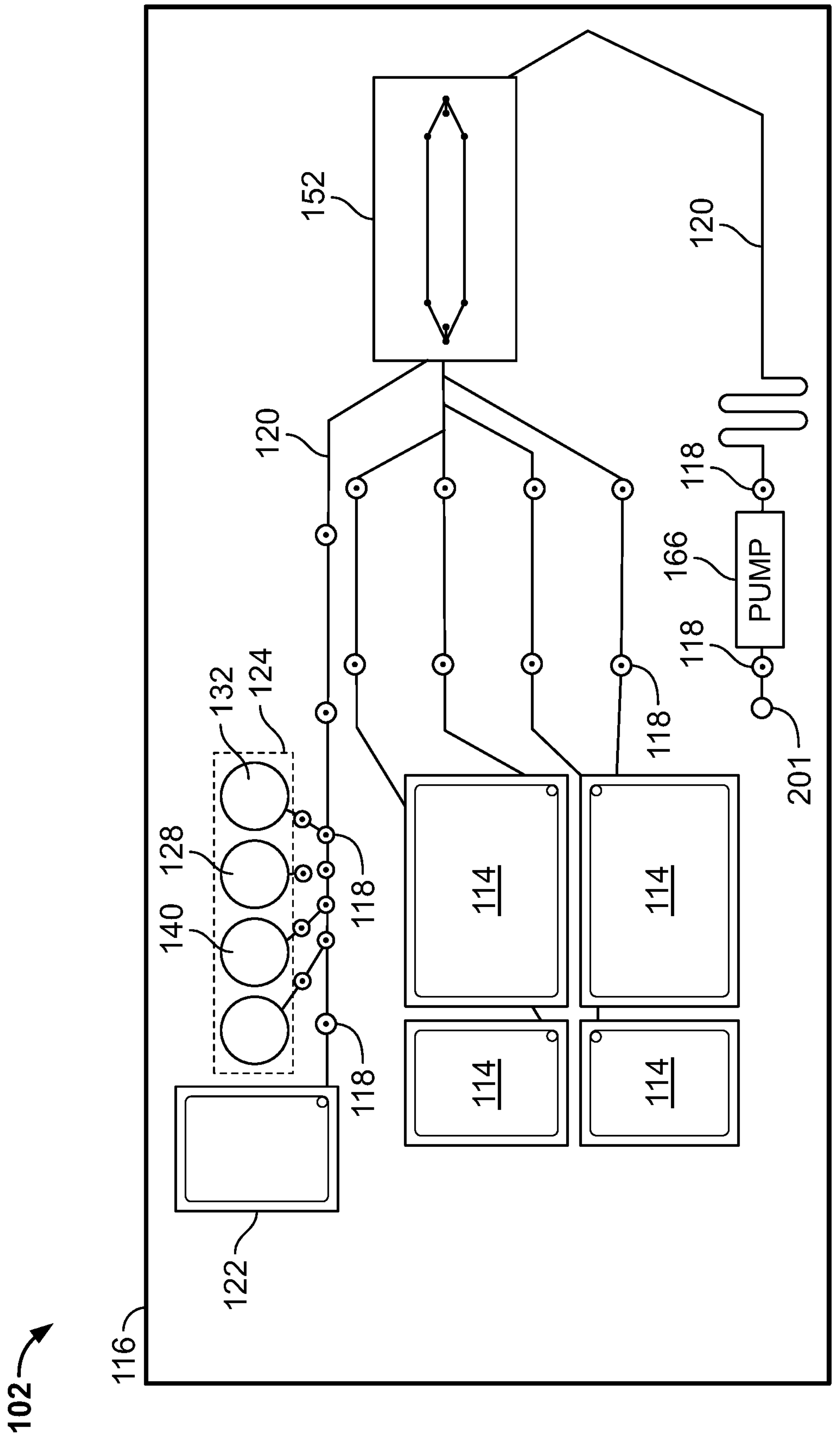
FIG. 2 is a plan view of an implementation of a reagent cartridge that can be used to implement the system of FIG. 1.

FIG. 2 is a plan view of an implementation of the reagent cartridge 102 that can be used to implement the system 100 of FIG. 1. The reagent cartridge 102 carries the flow cell 152 in the implementation shown and includes the body 116, the reagent reservoirs 114 including the liquid reservoir 122 and the well assembly 124, the valves 118, and the pump 166, which are fluidically coupled via the fluidic lines 120. The reagent reservoirs 114 may be integrally formed with the body 116 or may be separately formed but coupled to the body 116. The well assembly 124 may be coupled to the reagent cartridge 102 via a snap-fit connection, for example. While not shown, in other implementations, the reagent cartridge 102 may include the manifold 112 to provide positive pressure to the reagent reservoirs 114, the liquid reservoir 122 and/or to the wells 128 via the corresponding fluidic couplings 144. In such implementations, the reagent reservoirs 114 and/or the liquid reservoir 112 may include an inlet port that is fluidically coupled to the manifold 112.

The reagent reservoirs 114 and the liquid reservoir 122 may include liquid reagent such as water and one or more of the wells 128 may contain dry reagent. The liquid reservoir 122 has a volume of liquid that is used to rehydrate the reagent contained within one or more of the wells 128 of the well assembly 124 in some implementations. Similarly, the wells 128 may be sized to carry an amount of dry reagent associated with the various functions as disclosed herein. One of the wells 128 may be a first size and another of the wells 128 may be a second size, where the first size is different than the second size as an example. The wells 128 and the well assembly 124 are thus scalable and may be different sizes from one another depending on the volume of liquid used to rehydrate the dry reagent and the amount of reagent used to perform a particular task. Each of the wells 128 may be the same size in another example.

One or more of the valves 118 are selectively opened and liquid is flowed from the liquid reservoir 122 into the corresponding well 128 until the well 128 is full to rehydrate the dry reagent contained within the wells 128. The liquid may stop flowing into the well 128 after the liquid contacts the venting membrane 132 and the well 128 is filled. By fully filling the wells 128 with the liquid, the likelihood that some of the dry reagent 138 is not fully reconstituted is reduced. In other implementations, the wells 128 may not include the dry reagent and/or the well 128 may be partially filled with liquid.

The liquid and the dry reagent may be mixed by flowing the mixture back and forth between the well 128 and the fluidic line 120 and/or back and forth between the well 128 and another one of the wells 128 (e.g., the mixing chamber 139). The liquid 136 may be flowed into the wells 128 under positive pressure via the fluidic coupling with the manifold 112, for example, using an air spring associated with the respective well(s) 128 and/or under negative pressure using the pump 166. The liquid may be moved using the pump 166. Other methods of moving the liquid may, however, prove suitable.

Once the reagent is rehydrated, the pump 166 may draw reagent from the respective reagent reservoirs 122 and/or the wells 128 under negative pressure to an outlet 201 associated with the waste reservoir 109. The valves 118 disposed on either side of the pump 166 may be check valves to reduce or prevent backwash flow when operating the pump 166. The valves 118 on either side of the pump 166 may be omitted in other implementations.

The liquid can be forced out of the well 128 by opening the corresponding valves 118, releasing the pressure, and allowing the liquid to flow from the respective well 128 and toward the outlet 202 in implementations when the cover 140 forms at least a portion of an air spring that captures the positive pressure vented through the venting membrane 132. The well 128 may include a dead end at least partially formed by the cover 140 when the air spring is provided.

Figure 3:
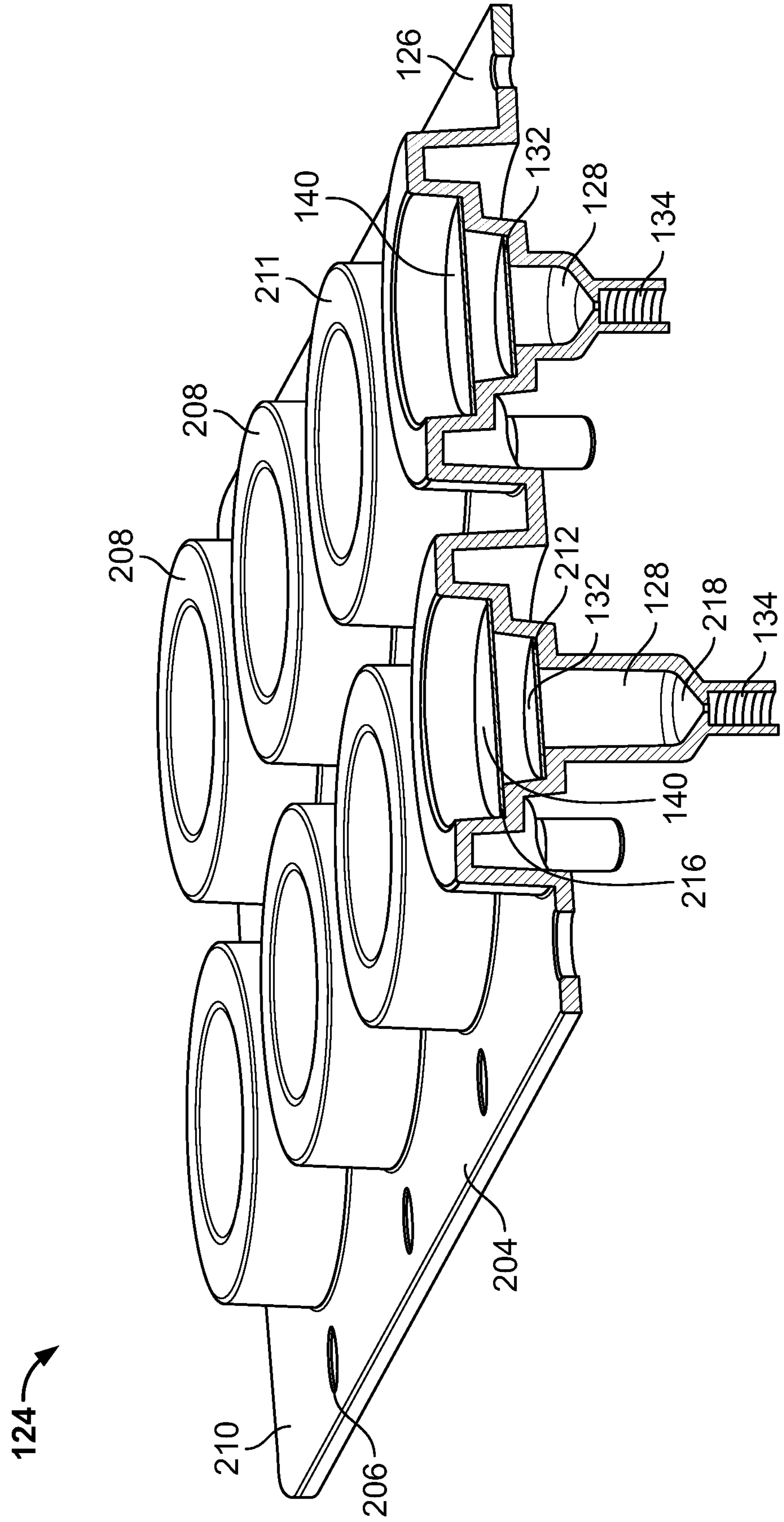
FIG. 3 is a partial cross-sectional isometric view of an implementation of a well assembly that can be used to implement the well assemblies of FIGS. 1 and/or 2.

FIG. 3 is a partial cross-sectional isometric view of an implementation of the well assembly 124 that can be used to implement the well assemblies 124 of FIGS. 1 and/or 2. In the implementation shown, the body 126 includes a plurality of the wells 128 (e.g., a ganged array) and a plate 204 that defines apertures 206 through which fasteners (e.g., locating pins) may extend to secure the well assembly 124 within the system 100 and/or to the liquid reservoir 122. The plate 202 is rectangular and includes eight wells 128, each having a collar 208 that extends from an upper surface 210 of the plate 202 and has a distal edge 211. The collars 208 may be sized to deter cross-contamination between the wells 128 during, for example, a dehydration process. Also, while the wells 128 are shown not containing dry reagent or another substance, in other examples, one or more of the wells 128 may include dry reagent.

The venting membranes 132 and the covers 140 are shown as circular discs that are coupled to the body 116 of the well assembly 124. The body 116 includes an inward facing step 212 to which the venting membrane 132 is coupled to facilitate the coupling between the venting membrane 132 and the body 116. The body 116 also includes a second inward facing step 216 to which the cover 140 is coupled. The venting membranes 132 and/or the covers 140 may be coupled to the body 126 using adhesive and/or by heat sealing, laser welding, and/or ultrasonic welding. Other coupling techniques my prove suitable, however.

The body 126 also includes an inward tapered surface 218 that extends toward the port 134 and defines the well 128. The inward tapered surface 218 encourages fluid to flow toward the port 134. The ports 134 of FIG. 3 are shown as threaded ports but another type of fluidic coupling such as a septum may be used instead. While a particular number of wells 128 are shown, any number of wells may be included instead (e.g., 1, 2, 3, 4, 10). Additionally, while the cover 140 of FIG. 3 is shown as being a pierceable sheet such as foil, the cover 140 may instead be a removable label or may be otherwise formed.

Figure 4:
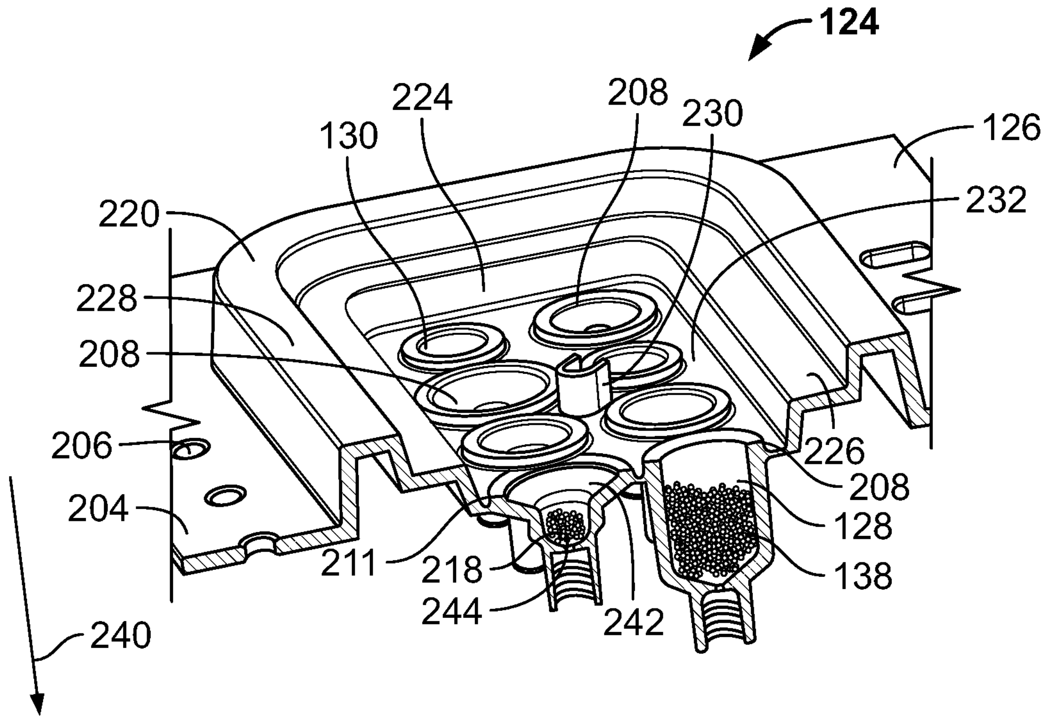
FIG. 4 is a partial cross-sectional isometric view showing an implementation of the well assembly with the hydrophobic venting membrane and the cover removed that can be used to implement the well assemblies of FIGS. 1 and/or 2.
Figure 5:
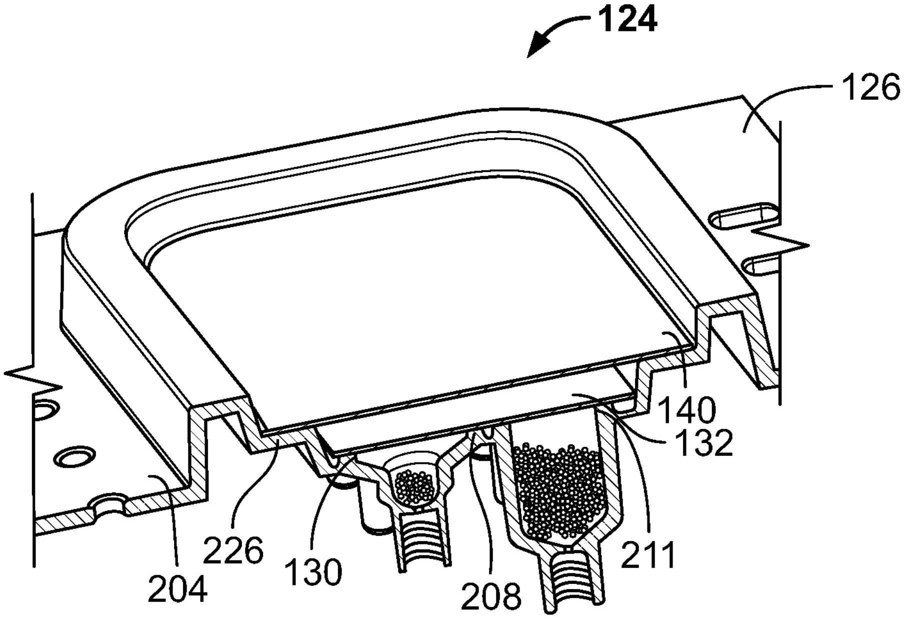
FIG. 5 is a partial cross-sectional isometric view showing the well assembly of FIG. 4 with the hydrophobic venting membrane and the cover included.

FIGS. 4 and 5 are partial cross-sectional isometric views showing the process of assembling an implementation of the well assembly 124 that can be used to implement the well assemblies 124 of FIGS. 1 and/or 2. Referring to FIG. 4, the well assembly 124 includes a lip 220 that extends from the plate 204 and forms a portion of an enclosure 224 in the implementation shown. The lip 220 includes an inward facing step 226 to which the cover 140 can be coupled (See, FIG. 5) and an interface 228 that allows the well assembly 124 to be coupled to a pressure source of the system 100 or to the gas source 103 via the fluidic coupling 144. The well assembly 124 of FIG. 4 also includes a projection 230 that extends from a lower surface 232 of the body 126 that defines a portion of the enclosure 224. The projection 230 is shown being U-shaped and is positioned to pierce the cover 140 when the cover 140 is moved toward the lower surface 232 and/or toward the wells 128 in a direction generally indicated by arrow 240.

The venting membranes 132 that cover the respective wells 128 may have a threshold size such as approximately 1 millimeter (mm) to satisfy a threshold air flow through the venting membrane 132. The venting membrane 132 may, however, be a different size. To achieve the threshold size of the venting membrane 132 for wells 128 having a smaller volume, in the implementation shown, some of the wells 128 include an inward tapered surface 242 that extends inward from the collar 208 and toward a central portion 244 of the well 128. The central portion 244 of the well 128 may or may not contain the dry reagent 138. To satisfy the threshold air flow through the venting membrane 132, pores of the venting membrane 132 may be approximately one quarter of a micron (μm). Different pore sizes may, however, prove suitable.

FIG. 5 shows a single venting membrane 132 covering the openings 130 of the wells 128. The venting membrane 132 is coupled to the distal edges 211 of each of the collars 208 to individually isolate the wells 128 from one another to deter cross-contamination between the contents of each of the wells 128. The cover 140 is shown coupled to the inward facing step 226.

Figure 6:
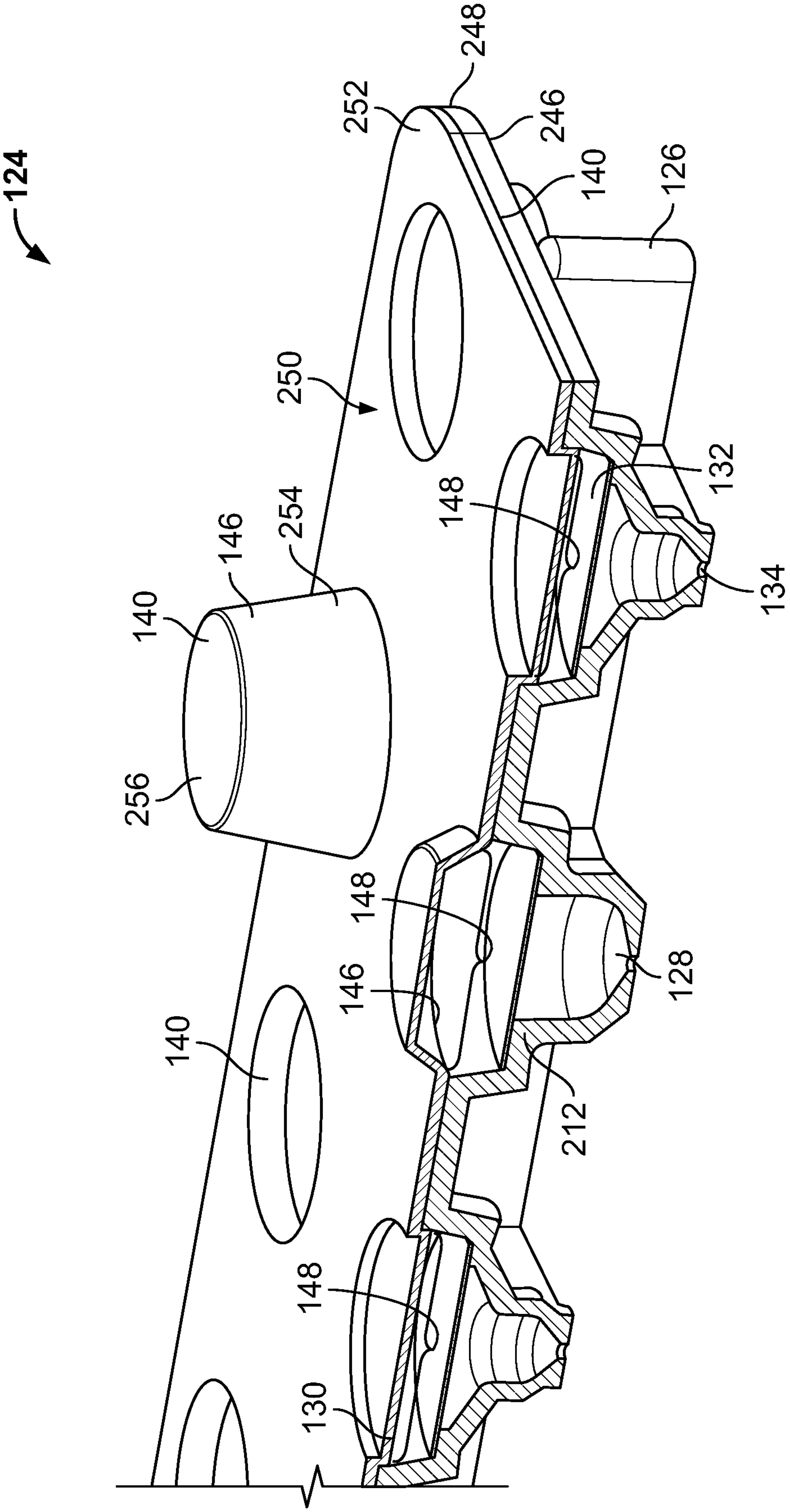
FIG. 6 is a partial cross-sectional view of another implementation of the well assembly that can be used to implement the well assemblies of FIGS. 1 and/or 2.

FIG. 6 is a partial cross-sectional view of another implementation of the well assembly 124 that can be used to implement the well assemblies 124 of FIGS. 1 and/or 2. The body 126 includes a plurality of the wells 128 in the implementation shown and a plate 246 that includes a coupling surface 248 that defines the openings 130 of the wells 128. Thus, in contrast to the well assembly 124 of FIG. 3, the well assembly 124 of FIG. 7 does not include the collars 208 but instead includes the coupling surface 248 that defines the openings 130 and extends between the wells 128.

A cover assembly 250 is coupled to the coupling surface 248 of the well assembly 124 in the implementation shown and includes a plurality of the covers 140, the supports 148, and a cover plate 252 from which the covers 140 extend. The covers 140 are disposed over each of the wells 128 and form corresponding enclosures 146. The size of the enclosure 146 is dependent on a height of the cover 140 and whether the cover 140 extends away from the corresponding well 128 (concave) or toward the corresponding well 128 (convex). Each of the covers 140 are shown having side walls 254 and an end 256 that form a frustum. The covers 140 may be shaped differently, however. While the supports 148 are shown being part of the cover assembly 250 and, in some instances, extending into the dimensional envelope of the well 128, the supports 148 may be a separate component positioned between the cover assembly 250 and the body 116 of the well assembly 124 or the supports 148 may be omitted.

Figure 7:
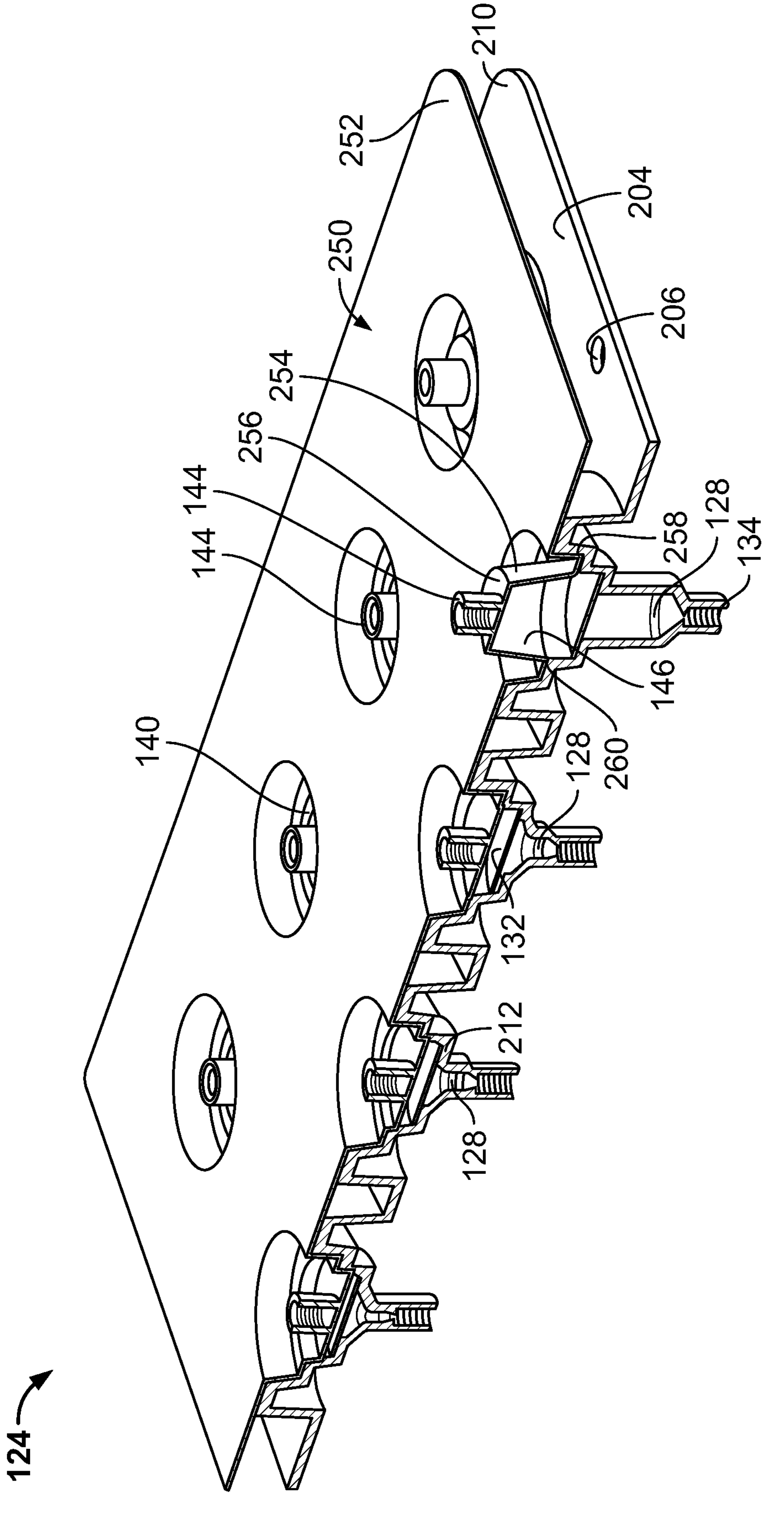
FIG. 7 is a partial cross-sectional view of another implementation of the well assembly that can be used to implement the well assembly of FIGS. 1 and/or 2.

FIG. 7 is a partial cross-sectional view of another implementation of the well assembly 124 that can be used to implement the well assembly 124 of FIGS. 1 and/or 2. The well assembly 124 of FIG. 7 is similar to the well assembly 124 of FIG. 3. In contrast the well assembly 124 of FIG. 3, however, the well assembly 124 of FIG. 7 does not include the individual pierceable covers 140 but instead includes the cover assembly 250. The cover assembly 250 includes the cover plate 252 and a plurality of the covers 140 in the implementation shown that cover the respective wells 128. The covers 140 include the fluidic coupling 144 to allow the enclosure 146 to be pressurized by, for example, the gas source 103. The cover 140 also includes the side walls 254, the end 256 that defines the fluidic coupling 144, and a flange 258 that extends outwardly from a base 260 of the cover 140 and is coupled to the second inward facing step 216 of the body 126. While the cover assembly 250 is shown including the fluidic couplings 144, the fluidic couplings 144 may be omitted such that air springs are formed over each of the wells 128 (See, FIG. 6).

Figure 8:
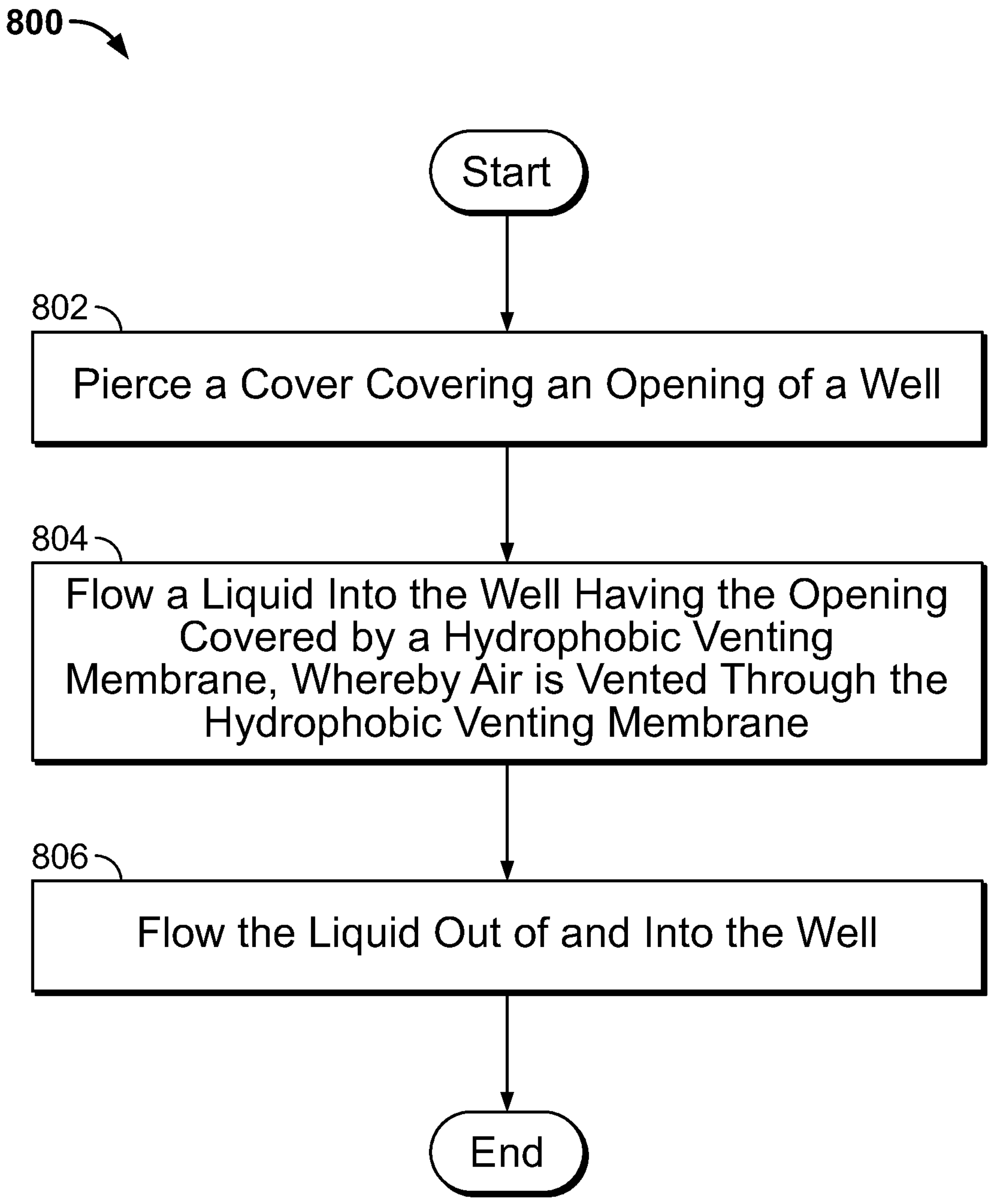
FIG. 8 is a flow chart for a method of performing a fluidic operation using the system of FIG. 1 or any of the well assemblies disclosed herein.
Figure 9:
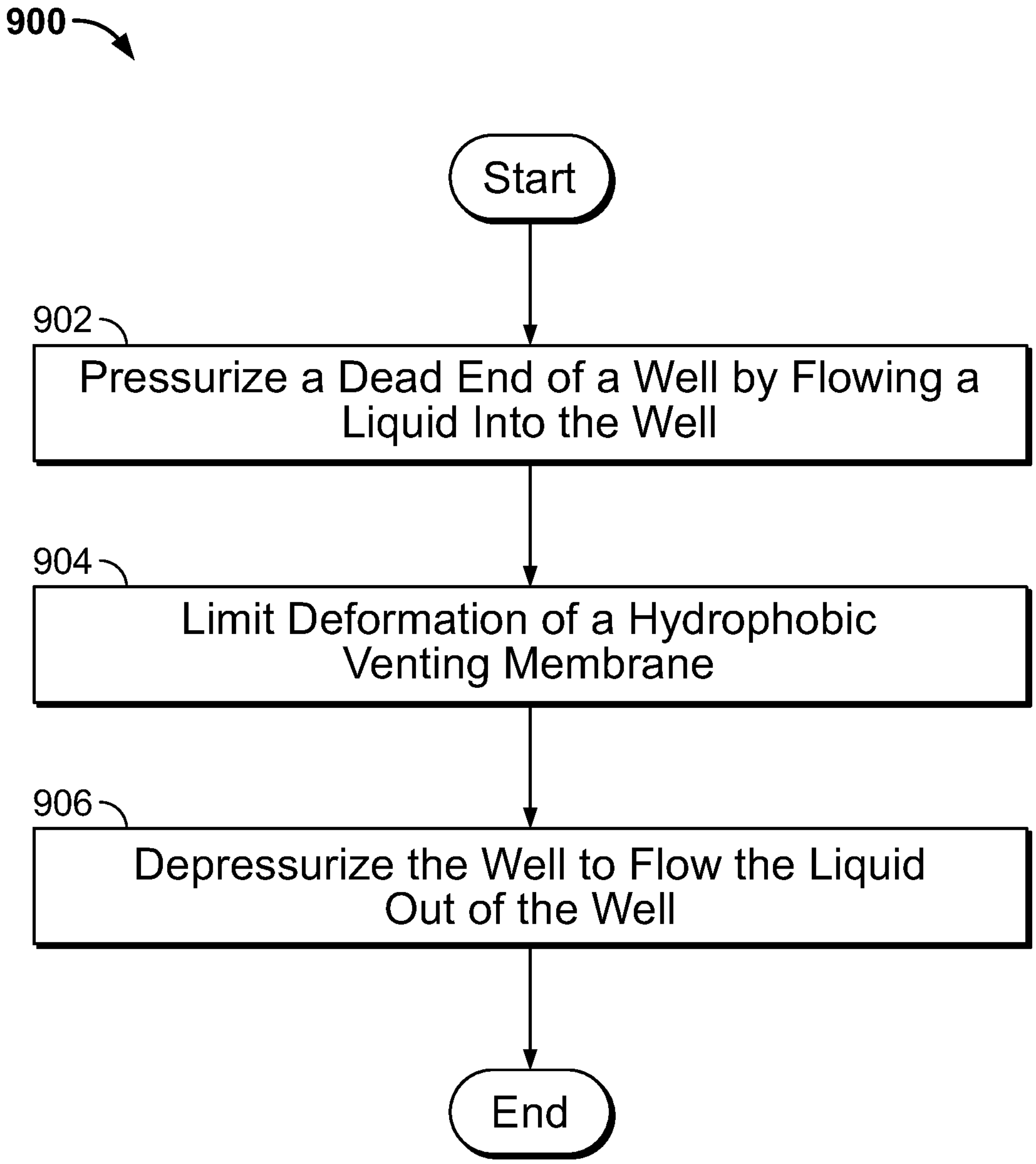
FIG. 9 is another flow chart for a method of performing a fluidic operation using the system of FIG. 1 or any of the well assemblies disclosed herein.

FIGS. 8-9 illustrate flowcharts for methods of performing a fluidic operation using the system 100 of FIG. 1 or any of the well assemblies 124 disclosed herein. The order of execution of the blocks may be changed, and/or some of the blocks described may be changed, eliminated, combined and/or subdivided into multiple blocks.

The process 800 of FIG. 8 begins by the cover 140 covering the opening 130 of the well 128 being pierced (block 802). The cover 140 may be pierced by an individual or by the system 100. The cover 140 is pierced by urging the cover 140 against the protrusion 222 and driving the protrusion 222 through the cover 140 in some implementations. In other implementations, the cover 140 is not provided or not pierced (see, FIGS. 6 and 7).

A liquid is flowed into the well 128 having the opening 130 and covered by the venting membrane 132, whereby air is vented through the venting membrane 132 (block 804). In implementations where the well 128 contains dry reagent, flowing the liquid into the well 128 rehydrates the dry reagent. The liquid is flowed out of and into the well 128 (block 806). The liquid can be flowed into and out of the well 128 by, for example, flowing the liquid back and forth between the well 128 and one of the fluidic lines 120 and/or between the well 128 and the mixing chamber 139. The liquid and/or the mixture may be moved under positive pressure and/or negative pressure. The positive pressure may be applied to the well 128 at, for example, the port 134 and/or the fluidic coupling 144. Positive pressure may also be provided when flowing the liquid into the well 128 and pressurizing a dead end of the well 128 that is at least partially formed by the cover 140 that covers the well 128. When the well 128 includes the dead end, the liquid can be flowed out of the well 128 by selectively opening an associated valve 118 and depressurizing the well 128.

The process 900 of FIG. 9 begins by pressurizing a dead end of the well 128 by flowing a liquid into the well 128 (block 902). In implementations where the well 128 contains dry reagent, flowing the liquid into the well 128 rehydrates the dry reagent. Deformation of the venting membrane 132 is limited (block 904). The deformation of the venting membrane 132 may be limited by positioning the support 148 above and/or below the venting membrane 132. The well 128 is depressurized to flow the liquid out of the well 128 (block 906). The well 128 can be depressurized by opening an associated valve 118 to flow the liquid to the fluidic line 120, the flow cell 152, and/or to the mixing chamber 139. In some implementations, the well 128 is iteratively pressurized and depressurized by flowing the liquid into the well 128 and dispensing the liquid from the well 128.

The foregoing description is provided to enable a person skilled in the art to practice the various configurations described herein. While the subject technology has been particularly described with reference to the various figures and configurations, it should be understood that these are for illustration purposes only and should not be taken as limiting the scope of the subject technology.

As used herein, an element or step recited in the singular and proceeded with the word "a" or "an" should be understood as not excluding plural of said elements or steps, unless such exclusion is explicitly stated. Furthermore, references to "one implementation" are not intended to be interpreted as excluding the existence of additional implementations that also incorporate the recited features. Moreover, unless explicitly stated to the contrary, implementations "comprising," "including," or "having" an element or a plurality of elements having a particular property may include additional elements whether or not they have that property. Moreover, the terms "comprising," including," having," or the like are interchangeably used herein.

The terms "substantially," "approximately," and "about" used throughout this Specification are used to describe and account for small fluctuations, such as due to variations in processing. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

There may be many other ways to implement the subject technology. Various functions and elements described herein may be partitioned differently from those shown without departing from the scope of the subject technology. Various modifications to these implementations may be readily apparent to those skilled in the art, and generic principles defined herein may be applied to other implementations. Thus, many changes and modifications may be made to the subject technology, by one having ordinary skill in the art, without departing from the scope of the subject technology. For instance, different numbers of a given module or unit may be employed, a different type or types of a given module or unit may be employed, a given module or unit may be added, or a given module or unit may be omitted.

Underlined and/or italicized headings and subheadings are used for convenience only, do not limit the subject technology, and are not referred to in connection with the interpretation of the description of the subject technology. All structural and functional equivalents to the elements of the various implementations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

It should be appreciated that all combinations of the foregoing concepts and additional concepts discussed in greater detail below (provided such concepts are not mutually inconsistent) are contemplated as being part of the subject matter disclosed herein. In particular, all combinations of claimed subject matter appearing at the end of this disclosure are contemplated as being part of the subject matter disclosed herein.

What is claimed is:

1. An apparatus, comprising:

a liquid reservoir containing a liquid;

a well assembly comprising:

- a body defining a well and having an opening and a port, the port being couplable to the liquid reservoir;
- a hydrophobic venting membrane coupled to the body and covering the opening; and
- a cover covering and spaced from the hydrophobic venting membrane, dried reagent contained within the well, wherein, as the liquid is flowed into the well via the port, the liquid rehydrates the dry reagent and the hydrophobic venting membrane vents gas contained within the well.

2. The apparatus of claim 1, further comprising a coupling between the liquid reservoir and the well assembly.

3. The apparatus of claim 2, wherein the coupling comprises a snap-fit connection.

4. The apparatus of claim 1, wherein the port comprises a septum.

5. The apparatus of claim 1, wherein the cover comprises an impermeable barrier.

6. The apparatus of claim 5, wherein the impermeable barrier comprises foil.

7. The apparatus of claim 1, wherein the cover forms at least part of a dead end.

8. The apparatus of claim 7, wherein the cover is coupled to the well and forms an enclosure that captures the gas that vents through the hydrophobic venting membrane.

9. The apparatus of claim 1, wherein the well is couplable to a pressure source.

10. The apparatus of claim 1, further comprising a support extending across at least a portion of the opening.

11. The apparatus of claim 10, wherein the support is disposed between the hydrophobic venting membrane and the cover.

12. The apparatus of claim 10, wherein the support comprises a lattice structure.

13. The apparatus of claim 1, wherein the cover is coupled to the body, the dried reagent is positioned between the port and the hydrophobic venting membrane and the hydrophobic venting membrane is positioned between the dried reagent and the cover.

14. The apparatus of claim 1, wherein the cover is configured to reduce a rate at which the dry reagent contained within the well is rehydrated, via the ingress of moisture.

15. An apparatus, comprising:

a well assembly comprising:

a body defining a well having an opening;

a hydrophobic venting membrane coupled to the body and covering the opening; and a cover covering and spaced from the hydrophobic venting membrane;

dried reagent contained within the well, wherein the hydrophobic venting membrane vents gas contained within the well.

16. The apparatus of claim 15, wherein the body comprises a plurality of wells each having a corresponding opening and a port.

17. The apparatus of claim 15, wherein the body comprises an inward extending step that at least partially defines the well and wherein the hydrophobic venting membrane is coupled to the step.

18. The apparatus of claim 15, wherein the body comprises an inward tapered surface that extends toward a port and defines the well.

19. The apparatus of claim 15, further comprising a second well comprising an opening, wherein the hydrophobic venting membrane covers the openings of the the well and the second well.

20. The apparatus of claim 15, wherein the cover is coupled to the body and covers the hydrophobic venting membrane.

21. The apparatus of claim 15, further comprising a second well, wherein the cover forms an enclosure above the well and the second well.

22. The apparatus of claim 15, wherein the cover comprises a frustum.

* * * * *